(12) United States Patent
Yamamoto et al.

(10) Patent No.: US 6,926,460 B2
(45) Date of Patent: Aug. 9, 2005

(54) FIXING STRUCTURE FOR FIXING A PIN TO A LINK IN A CATERPILLAR

(75) Inventors: Teiji Yamamoto, Osaka (JP); Akira Hashimoto, Osaka (JP); Hiroyuki Nakaishi, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/814,183

(22) Filed: Mar. 22, 2001

(65) Prior Publication Data

US 2002/0131817 A1 Sep. 19, 2002

(30) Foreign Application Priority Data

Mar. 16, 2001 (JP) ........................................ 2001-076340

(51) Int. Cl.[7] ............................................. B62D 55/21
(52) U.S. Cl. ..................................... 403/315; 305/204
(58) Field of Search ................................ 305/202, 203, 305/59, 42, 53, 47–49, 204; 198/851–853; 474/228–231; 403/315–320, 359.5, 359.6, 272; 59/84

(56) References Cited

U.S. PATENT DOCUMENTS

| | | | | |
|---|---|---|---|---|
| RE22,488 E | * | 5/1944 | Focke | ........................ 474/231 |
| 4,150,856 A | * | 4/1979 | Hakkenberg et al. | ....... 305/106 |
| 5,076,149 A | * | 12/1991 | Everts | ...................... 123/193.6 |
| 6,422,667 B2 | * | 7/2002 | Miyaura | ...................... 305/202 |

FOREIGN PATENT DOCUMENTS

| | | |
|---|---|---|
| JP | 46-18569 | 6/1971 |
| JP | 2001-10552 | * 1/2001 |

* cited by examiner

*Primary Examiner*—James R. Brittain
(74) *Attorney, Agent, or Firm*—Armstrong, Kratz, Quintos, Hanson, & Brooks, LLP.

(57) ABSTRACT

An link of a caterpillar which is allowed to maintain stabilized durability for a long period. The fixing structure has a link, and a pin inserted into a pin inserting bore formed in the link. A peripherally extending concave groove formed on the end portion of the pin and an opening periphery conjugate to forms an annular space. In order to limit relative escaping motion of the pin in the off-opening side (toward receding direction), a escape limiting ring is fitted into the annular space. The hardness of the bottom surface of the peripherally extending concave groove is lowered than the surface hardness of a link engaging portion of the pin.

5 Claims, 13 Drawing Sheets

FIXING STRUCTURE FOR FIXING A PIN TO A LINK IN A CATERPILLAR

BACKGROUND OF THE INVENTION

1. Field of the Invention

The present invention relates to a caterpillar, and more particularly to a fixing structure used to fixing a pin with a link in the caterpillar.

2. Background of the Invention

In general, caterpillar type vehicles, such as heavy equipment containing bulldozers, hydraulically operated shovels and the like, have caterpillars, wherein each the caterpillar has an endless link chain 51 comprising a series of links, as shown in FIG. 12, wherein on each the link a tread plate (not shown) for traveling on the ground may be mounted. The link chain 51 has links 52a and 52b that are substantially parallel and opposing to each other, with the link chain provided with a connecting means 54 for pivotally connecting links 52a and 52b. The links 52a and 52b respectively has a middle portion 55 with the not shown tread plate mounted thereon and connecting portions 56 and 57, wherein these portions 56 and 57 extend from the opposite ends of the middle portion 55, wherein the portion 56 is disposed inside the center line L of the link 52a or 52b and the portion 57 is disposed outside the center line L of the link. The connecting portion 56 is provided with a pin inserting bore 58, and the connecting portion 57 is provided with a bush inserting bore 59. The connecting means (connecting mechanism) 54 has a pin 60 and a bush fitted thereon.

In assembling of the traveling caterpillar, the first bush 61 disposed between the connecting portions 57,57 of the oppositely disposed links 52a, 52b, second each end of the bush 61 is inserted into the bush inserting bore 59 of each side, with the pin 60 having been inserted into the bush 61. Opposite end portions of the pin 60 that are protruded from the bush 61 are inserted into inserting bores 58 of the other links 52a and 52b to be connected, thereafter links 52a or 52b (general symbol: 52) are firmly connected with the pin 60 by means of fixing structure 62 shown in FIG. 13.

Fixing structure 62 functions in such a manner that when an escape-preventing ring 64 is fitted into a space 63, this escape-preventing ring 64 limits escaping relative motion of the pin 60 with respect to link 52 toward off-opening side (receding direction), wherein the fixing structure 62 is formed with an annular space 63 between the periphery of an opening (herein after, mentioned as an opening-periphery) of the pin inserting bore 58 and end portions of the pin. On the end portion of the pin, a peripherally extending concave groove 65 is formed, while on the opening-periphery of the pin inserting bore 58, a tapered surface 66, which narrows (decrease its diameter) inwardly along the longitudinal direction of the bore 58, is formed, so that the space 63 is formed by the tapered surface 66 and the peripherally extending concave groove 65.

However, in the fixing structure described above, the escape-preventing ring 64 fitted into the space 63 may act as a wedge such as would exerts comparatively large tensile stress around the peripherally extending concave groove 65. This kind of pin 60 usually produced having comparatively high hardness, such as, for example, ranging from 50 to 65 as measured by $H_RC$ scale, therefore, the escape-preventing ring 64 can cause brittle fracturing of the bottom surface of the peripherally extending concave groove 65 when the escape-preventing ring 64 is fitted into the groove, causing stable fixing state to be hardly maintainable.

In view of the above, the present invention is intended to overcome above problems, and it is an object of the present invention to provide a new and improved fixing structure for connecting the pins with the links in the caterpillar, allowing the caterpillar to have stabilized durability for a long period.

SUMMARY OF THE INVENTION

The fixing structure, according to the principles of the present invention, for connecting a pin with a link in a caterpillar is characterized in that, a pin 2 is fitted into a pin inserting bore 7 formed in the link 1, wherein on the end portion of the pin 2, a peripherally extending concave groove 18 is formed so that an annular space 16 is formed between the opening-periphery of the pin inserting bore 7 and the peripherally extending concave groove 18, and into this peripherally extending concave groove 18, an escape-preventing ring 17 for limiting escaping relative motion of the pin 2 toward the off-opening side is fitted, further the hardness of the pin 2 at the bottom surface of the groove 18 is lowered than that of the pin 2 at the portion with which the link 1 is connected.

The fixing structure, according to the principles of the present invention, for connecting the pin with the link in the caterpillar has some advantages as follows. The escape-preventing ring 17 fitted into the annular space 16 can effectively prevent escaping of the pin 2 from the link 1, allowing the stable connection between the link 1 and the pin 2. In the event that the escape-preventing ring 17 exerts around the bottom surface of the peripherally extending groove 18 when the ring 17 is fitted into the groove 18, brittle fracturing on the bottom surface of the groove 18 can be prevented because of lowered hardness of the bottom surface of the groove 18. Accordingly, by applying the fixing structure of this invention to assembling of a caterpillar wherein the pin 2 is connected with the link 1, vehicles provided with the caterpillar can maintain stable reliability for a long period, here, the vehicle means heavy equipment, such as, for example, bulldozers, hydraulically operated shovels, and the like.

The fixing structure, according to the principles of the present invention, for connecting the pin with the link in the caterpillar, is characterized in that the hardness at the bottom surface of the peripherally extending groove 18 around the pin 2 is lowered by means of annealing process.

Accordingly, by use of the fixing structure, according to the principles of the present invention, for connecting the pin with the link in the caterpillar according to the principles of the present invention, the hardness at the bottom surface of the groove 18 around the pin 2 can be easily lowered, productivity can be enhanced, and brittle fracturing is effectively prevented.

The fixing structure, according to the principles of the present invention, for connecting the pin with the link in the caterpillar, is characterized in that the hardness at the bottom surface of the peripherally extending groove 18 around the pin 2 should preferably be maintained from 30 to 45 as measured by $H_RC$ scale, while the surface hardness at the portion of the pin 2 with which the link is connected should preferably be maintained from 50 to 65 as measured by $H_RC$ scale.

Accordingly, by use of the securing structure, according to the principles of the present invention, for connecting the pin with the link in the caterpillar according to the principles of the present invention, the pin 2 is strengthened as a whole, thereby stabilizing the caterpillar using the fixing structure of this invention.

In the fixing structure, according to the principles of the present invention, for connecting the pin with the link in the caterpillar as an optional matter, the peripherally extending groove 18 is provided at its bottom surface with a ring guiding ramp surface or tapered surface 20 which guides the above mentioned escape-preventing ring 17 inwardly from outward along the longitudinal direction of the ring 17.

By use of the fixing structure, according to the principles of the present invention, for connecting the pin with the link in the caterpillar, the escape-preventing ring 17 is guided by the guiding ramp 20 when the escape-preventing ring 17 is fitted into the annular space 16, allowing simple and reliable operation in engagement of the ring 17.

Further, in the fixing structure, according to the principles of the present invention, for connecting the pin with the link in the caterpillar, the following structure is optionally adaptable. The link 1 has a tapered surface 19 around the opening-periphery of the pin-inserting bore 7, the tapered surface being narrowed (decreased in diameter) inwardly along longitudinal direction, while pin 2 has a ring guiding tapered surface 20, and then that virtually extended surfaces of the tapered surfaces 19 and 20 are designed to acutely intersect together. Into an annular space 16 defined by the surface 19 and 20, the escape-preventing ring 17 is pressed, so that frictional force is generated by compression force due to press-fitting of the escape-preventing ring 17. By such frictional force, such state that the escape-preventing ring 17 is hardly allowed to come out from the annular groove 16, so to say, self-supporting wedging state is established.

In the fixing structure for connecting the pin with the link in the caterpillar, if the angle between the ring guiding ramp surface 20 and the axis of the pin 2 ranges from 20 to 60 degrees, the axial motion of the pin 2 during travel of the caterpillar induces substantially compression force acting on the escape-preventing ring 17. However, a snap ring shown in the Japanese Utility Model Publication No. Sho 46-18569 Gazette and the like, induces shear force acting on the escape-preventing ring. It is apparent that the fixing structure of this invention is superior as compared with the conventional structure, provided that the same material is used in this comparison, because such material in problem usually shows high compression-resistant strength rather than shear-resistant strength.

DETAILED DESCRIPTION OF THE INVENTION

Figure 1:
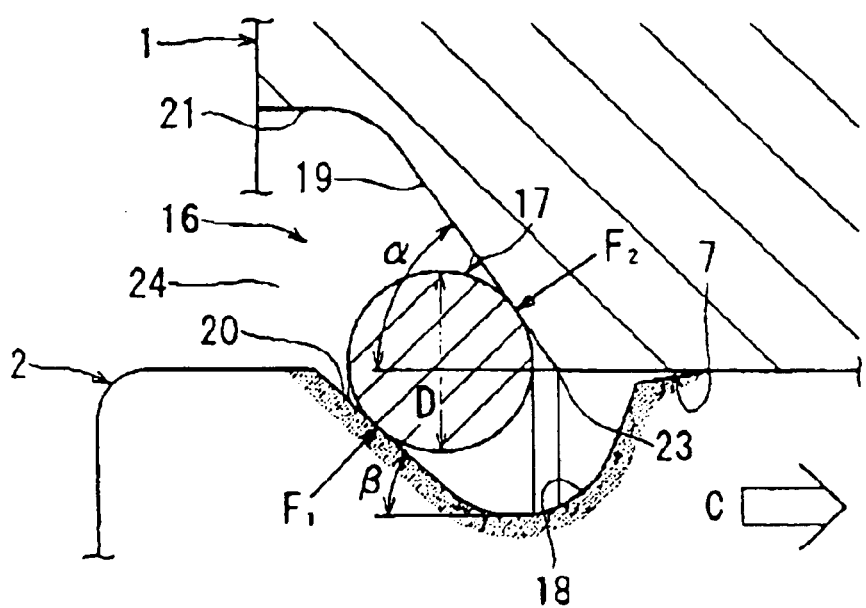
FIG. 1 is a cross sectional view showing an embodiment of the fixing structure having a pin fixed with a linking accordance with the present invention.
Figure 2:
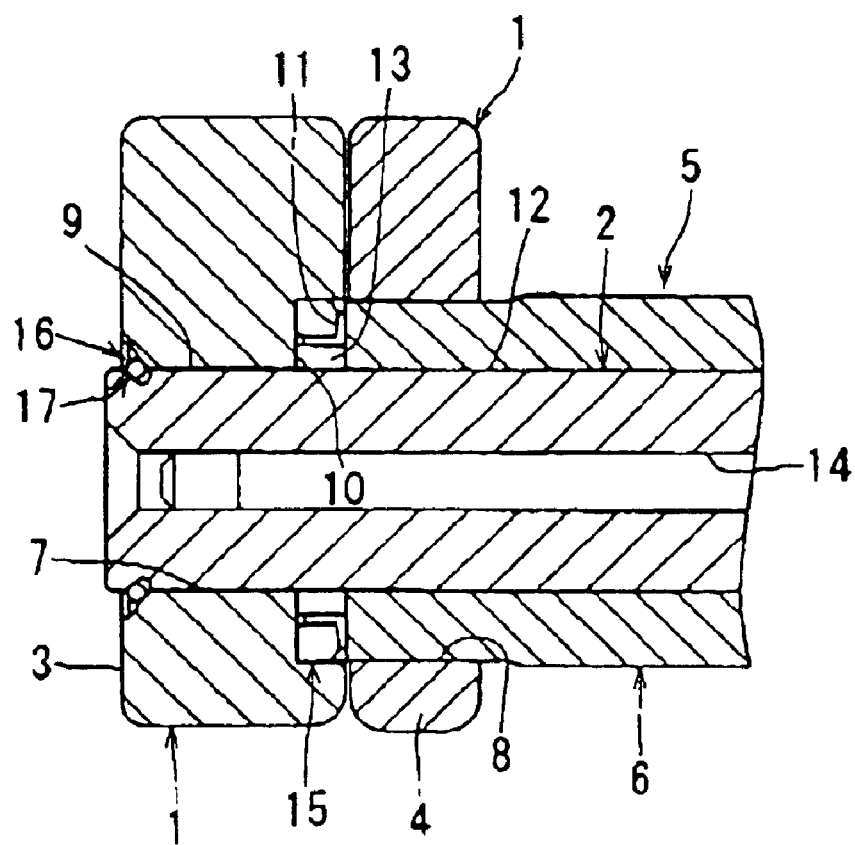
FIG. 2 is a cross sectional view showing relationship between a rink and pin of used to a caterpillar

The features and advantages of the present invention will become more apparent from the following detailed description of the presently preferred embodiment as illustrated in accompanying drawings. FIG. 1 shows a cross sectional view of an interested fixing structure, and FIG. 2 shows across sectional view of the main portion of a caterpillar using the fixing structure. Where, the caterpillar is defined as a travelling caterpillar such as shown in FIG. 1 for use in caterpillar type vehicles such as heavy equipment comprising, for example, bulldozers, hydraulically operated shovels, and the like, and the fixing structure is defined as a structure that contains a link 1 and a pin fixed to the link 1.

Figure 12:
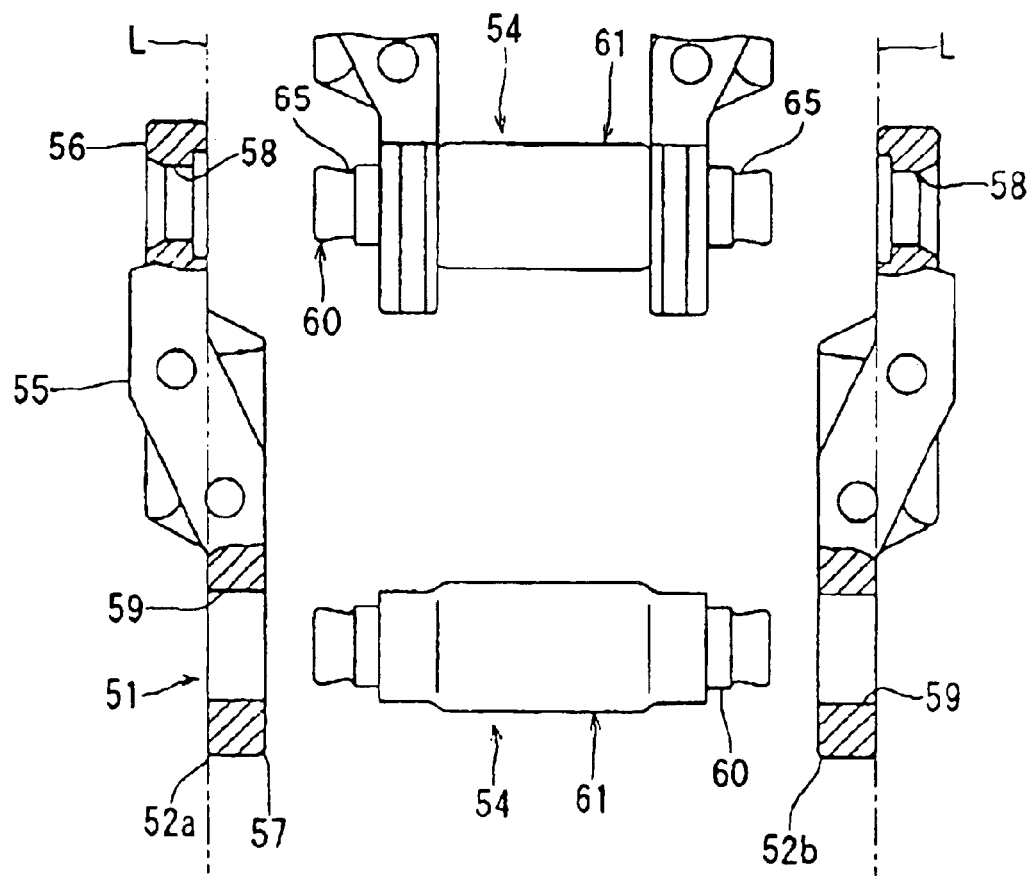
FIG. 12. is a cross sectional view showing conventional fixing structure having a pin fixed with a link.
Figure 13:
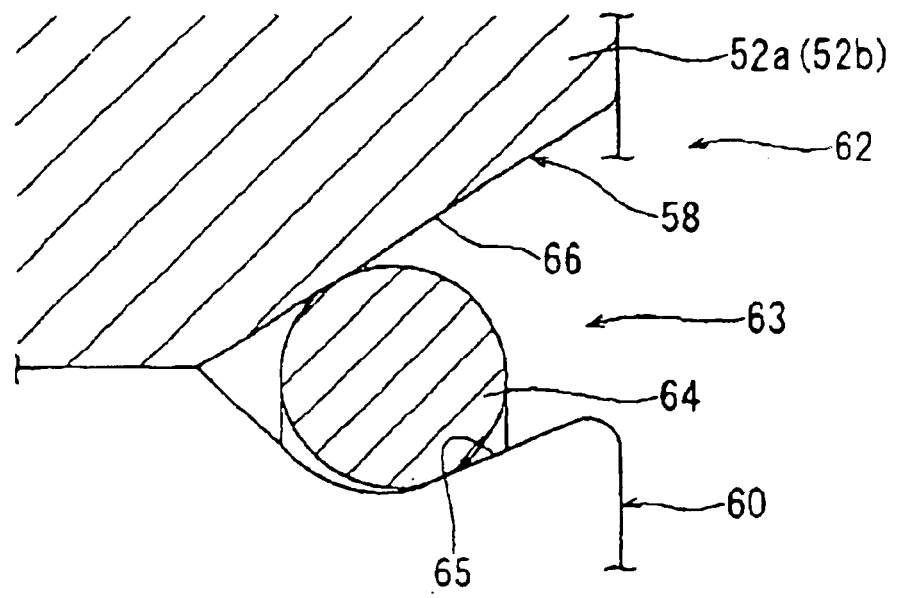
FIG. 13. is an enlarged cross sectional view showing conventional fixing structure.

In FIG. 2, numeral 3 shows a first connecting portion of the link 1, and numeral 4 shows a second connecting portion of the other link 1 which is connected to the first connecting portion 3 of the link 1. That is, each link 1 has the first connecting portion 3 on one side and the second connecting portion 4 on the other side, wherein the first connecting portion 3 of the link 1 is connected to the second connecting portion 4 of the neighboring link 1 to be connected by means of connecting means comprising the securing structure of this invention. In the connection, the first connecting portion 3 is arranged outwardly, while the second connecting portion 4 is arranged inwardly, with these portions 3 and 4 being tiered one another. By the way, between the first and second connecting portions 3 and 4, a middle portion is formed on which a tread plate is mounted as shown in FIG. 12.

The above connecting means 5 comprises the pin 2 and a bush 6 fitted on the pin 2. the first connecting portion 3 of the link 1 is formed with an inserting bore 7, while the second connecting portion 4 is formed with a bush inserting bore 8. The end portion of the pin 2 is protruded outwardly and longitudinally of the bush 6 so that the end potion is pressed into the pin inserting bore 7, while the end portion of the bush is pressed into the bush inserting bore 8. A bush side opening of the pin inserting bore 7 defines an enlarged (increased diameter) portion 10, and then a space 13, which is formed by wall surfaces of the enlarged portion 10, an outer end surface, and an outer peripheral surface 12 of the pin 2 has a seal member 15 fixed into the space 13. The pin 2 having the bush 6 rotatably mounted thereon is fixedly joined to the first connecting portion 3, and the bush 6 is fixedly joined to the second connecting portion 4, so that the first connecting portion 3 which is the end portion of the link 1, is pivotally connected to the second connecting portion 4 which is the end portion of the other link 1 to be connected. Further, the pin 2 is formed with a central lubrication bore 14, so that oil flows from the bore 14 through a not shown oil injecting passage to the outer peripheral surface of the pin 2 so as to lubricate the pin 2 and the bush 6.

The fixing structure, as shown in FIG. 1, comprises the annular space 16 formed by the end portion of the pin 2 and the opening-periphery of the inserting bore 7, and a escape-preventing ring 17 to be fitted into the annular space 16. An peripherally extending concave groove 18 is formed around the end portion of the pin 2, while an inner opening-periphery of the pin inserting bore 7 is provided with a tapered surface 19 the diameter of which decreases inwardly along the longitudinal direction of the pin 2, so that the annular space 16 is formed by the tapered surface 19 and the peripherally extending concave groove 18. The escape-resist ring 17 is formed of, for example, an annular elastic metal material having a circular cross section, with the ring 17 cut on a certain portion on an annular length of the ring 17. Therefore, the ring 17 is elastically deformable to increase or decrease own diameter The ring 17 is formed so that, when measured in its free state, an inner diameter is smaller than the outer diameter of the peripherally extending concave groove 18 measured at the bottom surface of the groove 18.

The peripherally extending concave groove 18 is formed at the bottom surface thereof with a ring guiding ramp surface 20 which guides the escape-preventing ring 17 inwardly from outward along the longitudinal direction. The inclination angle β of the ring guiding ramp surface 20 is given smaller than the inclination angle α of the tapered surface 19. The diameter of a guiding passage 24 defined by the tapered surface 19 and the ring guiding ramp surface 20 is decreased Inwardly of the opening of the guiding passage 24 along the longitudinal direction. The angle γ between a pair of the extended surfaces, i.e., the tapered surface 19 and the ring guiding ramp surface 20, is given to be an acute angle.

The hardness of the bottom surface around the peripherally extending concave groove 18 should preferably be lower than the surface hardness of the link engaging portion of the pin 2. The surface hardness in the bottom and its neighboring portions of the pin 2 should preferably be lower than the surface hardness in the other portion at the side portion of the pin 2. The pin 2 is made of middle carbon steel to have the surface hardness ranging from about 50 to about 65 as measured by $H_RC$ scale, and the bottom surface hardness ranging from about 30 to about 45 as measured by $H_RC$ scale, thereby the pin 2 to be given enough surface hardness. By the way, the pin 2 preferably has hardness ranging from about 20 to about 35 as measured by $H_RC$ scale. The escape-preventing ring 17 is made of, for example, SWC to have the surface hardness ranging from about 35 to about 45 as measured by $H_RC$, while the link 1 is made of middle carbon steel to have the surface hardness ranging from about 35 to about 45 as measured by $H_RC$ scale.

Figure 11:
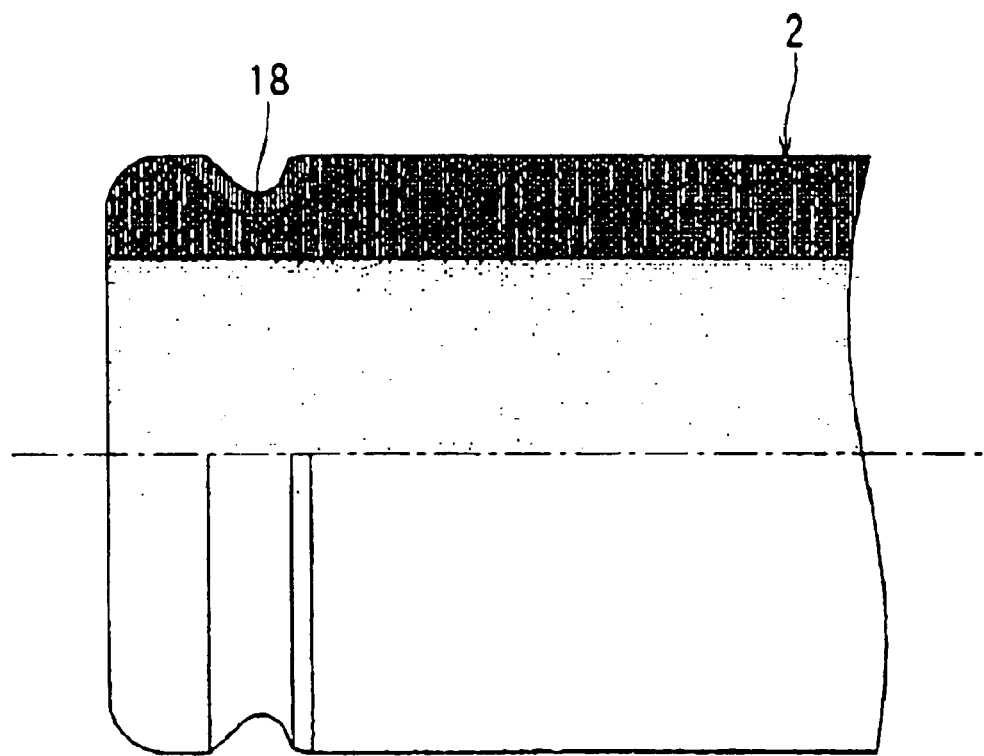
FIG. 11 is outer and cross sectional appearances showing hardness distribution in the fixing structure according to the present invention.

For the purpose of lowering hardness, the pin 2 is heat treated after forming the peripherally extending concave groove 18, wherein the portion to lower hardness is selectively annealed. For example, pin 2 is wholly heated, and cooled to quench it with, for example, water spray, thereafter, the portion to be provided with lowered hardness is reheated and then cooled slowly. In FIG. 11, portions having various hardness are distinguishably shown with a black and white contrast, wherein dark portion shows the link engaging portion with high hardness ($H_RC$ of about 50 to about 60), light portion shows the lower surface of the peripherally extending concave groove 18 with low hardness ($H_RC$ of about 50 to about 60), and more light portion shows central portion of the pin 2 with still lower hardness ($H_RC$ of about 20 to about 35).

Figure 3:
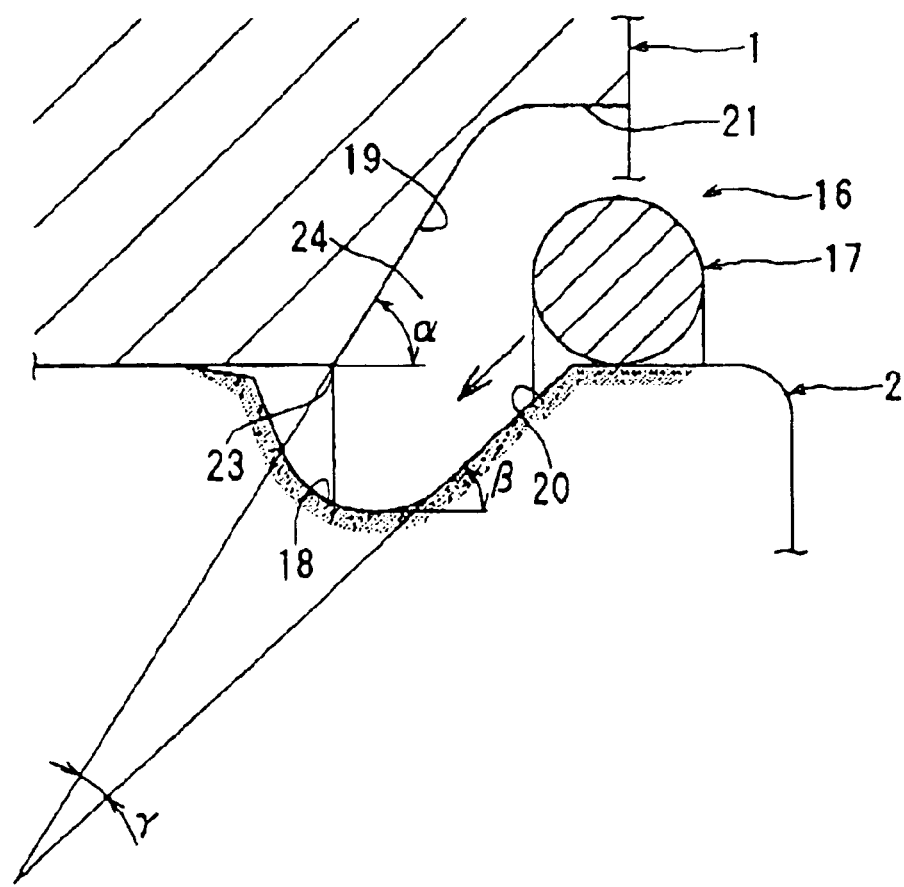
FIG. 3 is a cross sectional view showing fixing method for the fixing structure.

In the fixing structure with above features, in order to fixedly connect pin 2 with the link 1, as shown in FIG. 2, after the bush 6 is pressed into the inserting bore 8 of the link 1, while pin 2 is pressed into the inserting bore 7 of the pin 2, the escape-preventing ring 17 is merely fitted into the annular space 16 formed by the link 1 and the pin 2 toward the direction shown by an arrow in FIG. 3. Where, the escape-preventing ring 17 is engaged in its enlarged state, the escape-preventing ring 17 is advanced by own contracting force inwardly along the ring guiding ramp surface 20 into the annular space 16, allowing the escape-preventing ring 17 to contact with both the taper surface 19 and the ring guiding ramp surface 20. Where, the escape-preventing ring 17 is pressed inwardly along the longitudinal direction from the opening of the annular space 16 so that the escape-preventing ring 17 hardly come out from the annular space 16. During the pressing of the escape-preventing ring 17 into the annular space 16, both the taper surface 19 and the ring guiding surface exert compression stress to the escape-preventing ring 17 normal to the ring surface. Where, residual compression stress generates frictional force between the ring 17 and the surfaces 19 and 20, thereby the ring 17 being prevented from coming off. The taper surface 19 virtually intersects with the ring guiding ramp surface 20 with an acute angle, the escape-preventing ring 17 functions as a wedge, therefore, during the above pressing-in process of the ring 17, the self-supporting wedge must be established. According to the above, when the pin 2 moves to come out from the link 1, in other word, when the pin 2 intend to move toward the direction shown by arrow C in FIG. 1, the escape-preventing ring 17 is exerted compression force F1 and F2 from the taper surface 19 and the ring guiding ramp surface 20 respectively, both the compression force F1 and F2 being normal to these surfaces 19 and 20, In such state, the escape-preventing ring 17 exerts reaction force against the compression force F1 and F2 to prevent the pin 2 from escaping from the link 1.

In this state, the escape-preventing ring 17 exert pressing force, which is a reaction force against the compression force F1, to the pin 2 so as to induce a brittle fracture causing stress at the bottom surface of the peripherally extending concave groove 18. However, because the hardness of the bottom surface of the peripherally extending concave groove 18 is formed with lowered hardness, the brittle fracture is effectively prevented. As a result, the pin can be fixedly connected with the link 2 in stable state.

Figure 4:
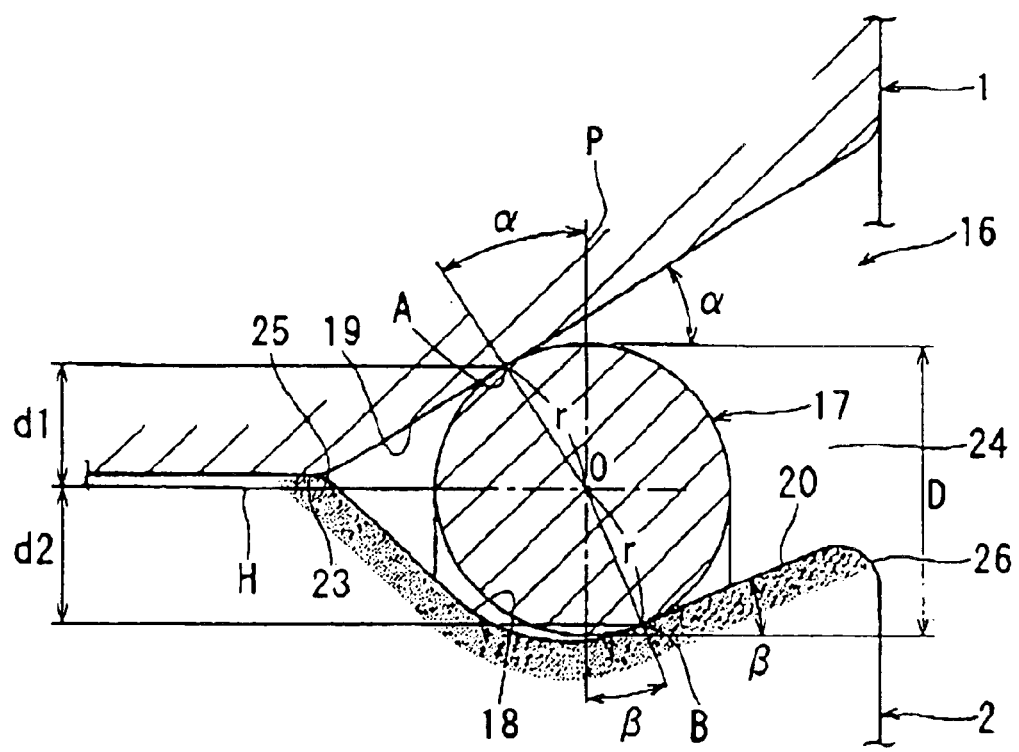
FIG. 4 is a cross sectional view showing another embodiment of the fixing structure with a pin fixed with a link.
Figure 5:
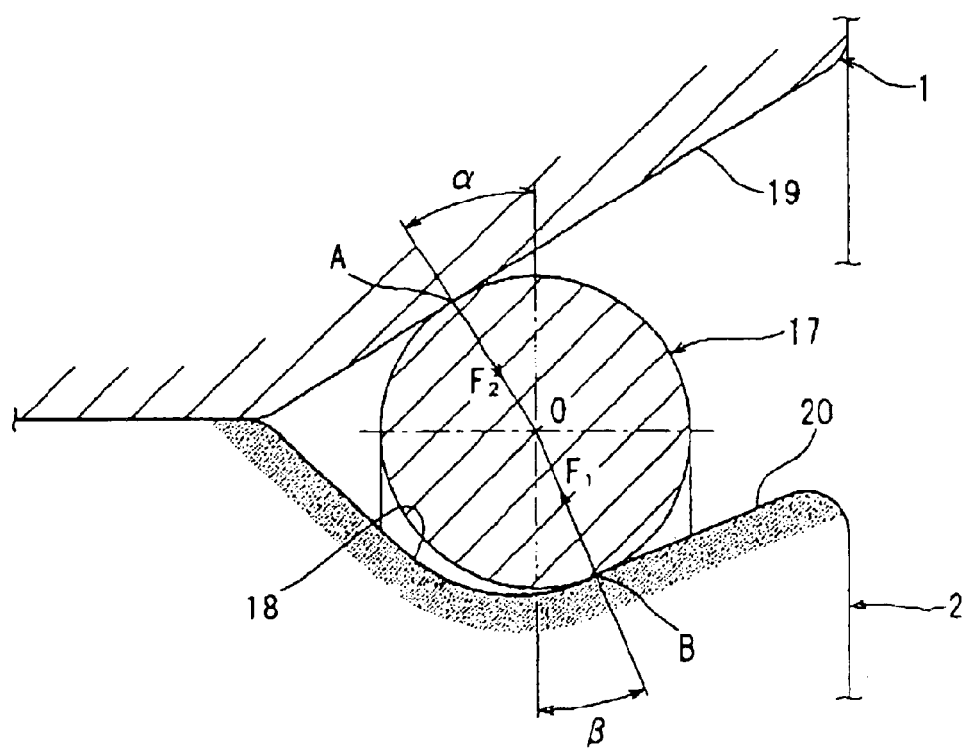
FIG. 5 is a cross sectional view showing function of the fixing structure.

In FIG. 4 another embodiment of the fixing structure is shown. The fixing structure of FIG. 4 is different from that of FIG. 2 in that the taper surface 19 of the link 1 has an inner diameter side periphery 23, while the concave groove 18 of the pin 2 has an opening periphery 25 located inwardly along the longitudinal direction so that these periphery 23 and 25 are substantially coincidentally meet. The concave groove 18 of the pin 2 has an opening-periphery 26 to be located outwardly along the longitudinal direction of the pin 2, and the periphery 26 is located in proximity of the longitudinal outermost edge of the pin 2, and has a diameter smaller than that of the end rim 25. The tapered surface 19 is given a slanting angle α larger than the slanting angle β of the ring guiding ramp surface 20, therefore, the annular space 16 must have an opening the inlet of which has a dimension larger than the diameter D in the cross section of the escape-preventing ring 17, and the annular space 16 must also have a diameter which decreases inwardly of the inlet of the opening along the longitudinal direction. The bottom surface of the concave groove 18 is given a hardness lower than the surface hardness at the link engaging portion of the pin 2. The hardness of the bottom of the concave groove 18, the surface hardness of the link engaging portion of the pin 2, the surface hardness of the escaping-preventing ring 17, and so on are generally same as the examples already illustrated above.

As shown in FIG. 4, the cross section of the escape-preventing ring 17 is divided in four areas, that is, the first, second, third, and fourth quadrants, and when the escape-preventing ring 17 is engaged with the link 1 and pin 2, the ring 17 contacts with the tapered surface 19 at a contacting portion A within the fourth quadrant, as well as, the ring 17 contacts with the ring guiding ramp surface 20 at a contacting portion B within the second quadrant. The above mentioned angle α corresponds to the angle defined between the following two lines, that is, the line passing through the contacting point A and the cross sectional center of the escape-preventing ring 17, and the vertical line P passing through the cross sectional center O of the escape-preventing ring 17, while, the above mentioned angle β corresponds to the angle defined between the following two lines, that is, the line passing through the contacting point B and the cross sectional center O of the escape-preventing ring 17, and the vertical line P.

Parameters D, r, $d_1$ and $d_2$ shown in FIG. 4 are defined as follows. Parameters D and r are the diameter and radius of the escape-preventing ring 17 in its cross section. Parameter $d_1$ is the distance from the horizontal line H passing through the cross sectional center O of the ring 17 to the contacting point A mentioned above, and Parameter $d_2$ is the distance from the horizontal line H to the contacting point B mentioned above. Where, the following relations are recognized.

$$D>(d_1+d_2), d1=(r\cdot\cos\alpha), d2=(r\cdot\cos\beta), r=D/2$$

In the fixing structure shown in FIG. 4, escaping of the pin 2 from the annular space 16 is effectively prevented because as the pin 2 moves to escape from the link 1 in the off-opening side of the opening, the escape-preventing ring 17 is exerted compression force $F_2$ acting normally onto the contacting surface between the ring 17 and link 1, while the escape-preventing ring 17 is exerted compression force $F_1$ acting normally onto the contacting surface between the ring 17 and pin 2. The material of the escape-preventing ring 17 should have enough compression strength for opposing to the compression force $F_1$ and $F_2$.

The escape-preventing ring 17 is preferably made of spring steel because it is necessary for the ring 17 to be fitted into the annular space 16.

Disclosed for example, in Japanese Utility Application Model Publication No. Sho 46-18569 Gazette, is an example of a snap ring that is generally fitted around a pin and the like to prevent escaping of the pin from the other member on which the pin is mounted, and the other is of the kind to which shear strength is demanded from preventing such escaping. However, based on the fact that metallic materials generally have compression strength larger than shear strength, it is apparent that the fixing structure, such as shown in FIG. 4, utilizing compression strength is advantageous as compared with the structure utilizing shear strength if the comparison is carried out using the same material.

Also in the fixing structure shown in FIG. 4, the hardness of the bottom surface of the peripherally extending concave groove 18 around the pin 2 is lowered than the hardness at the portion of the pin on which link 1 is mounted, so that brittle fracturing at the bottom surface of the peripherally extending concave groove 18 effectively prevented. Moreover, when the escape-preventing ring 17 is fitted into the annular space 16, the ring 17 is guided by the ring guiding ramp surface 20, realizing simple engaging operation. As the dimensional relationship such as mentioned above is specified, escaping of the pin 2 relative to the link 1 toward off-opening direction is prevented.

In the fixing structure shown in FIG. 4, it is preferable that the contacting point and its neighboring portion is formed with an annular surface that has a radius generally same as the outer peripheral surface of the escape-preventing ring so that the ring can be fitted into the annular space 16 in stable state.

Figure 6:
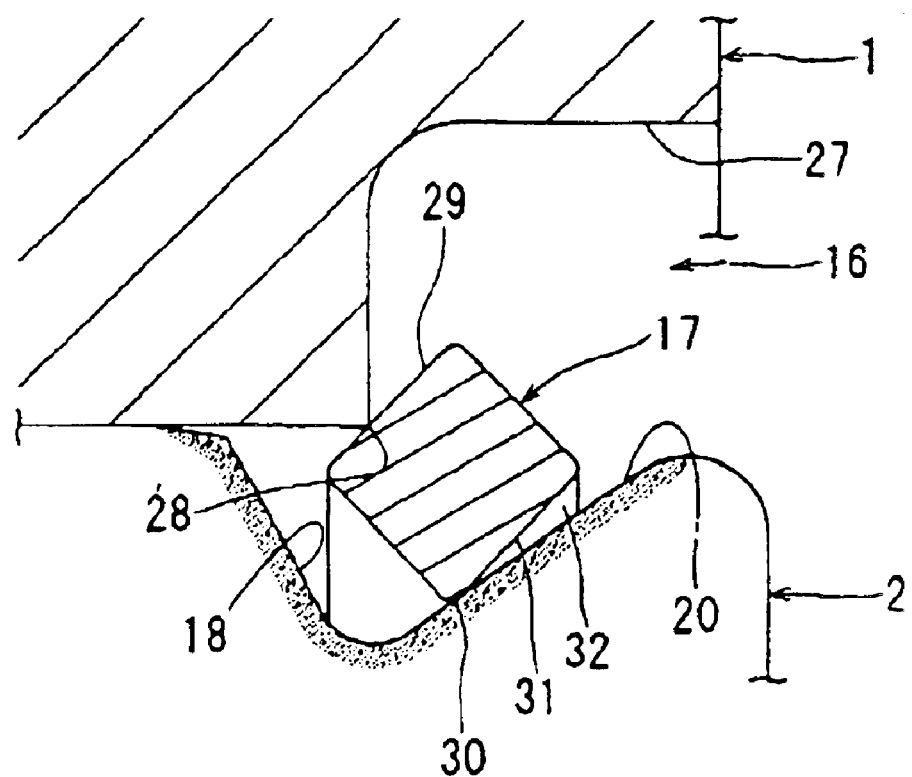
FIG. 6 is a cross sectional view showing further embodiment of the fixing structure with a pin fixed with a link.

FIG. 6 shows another embodiment wherein the escaping-preventing ring 17 has a cross section generally rectangular shaped. The link 1 has no tapered surface at the peripheral rim of the opening of the inserting bore 7, but has an enlarged portion 27 at the same portion. When the escaping-preventing ring 17 is fitted into the annular space 16, the edge 28 which is the portion having an inner diameter within the enlarged portion 27 is press fitted with the escaping-preventing ring 17 at the inner diameter corresponding portion 29, while the inner diameter side edge 30 of the escaping-preventing ring 17 is press fitted with the guiding ramp surface 20. Between the guiding ramp surface 20 and the guiding ramp surface corresponding surface 31 on the escaping-preventing ring 17 a gap 32 is formed, which enlarges toward the inlet of the annular space 16.

Figure 7:
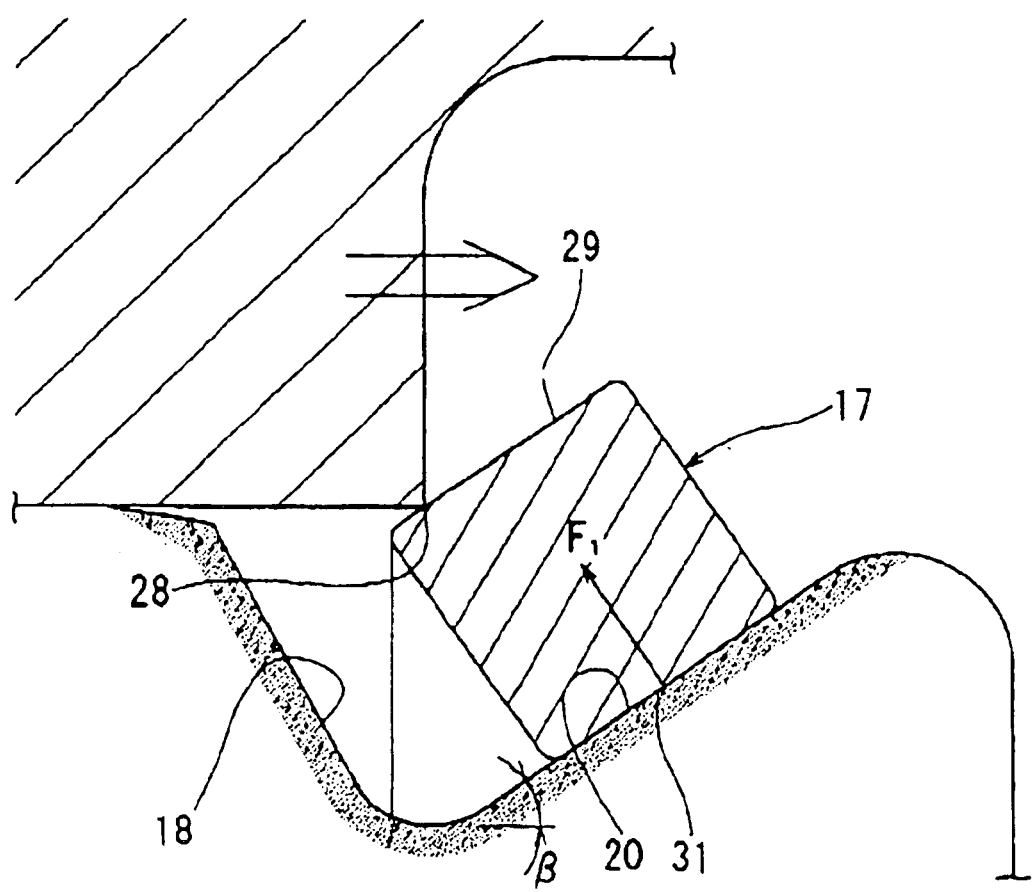
FIG. 7 is a cross sectional view showing function of the fixing structure in the embodiment of FIG. 6.

Then, if a force which promote escaping of the pin 2 relative to the link 1 toward off-opening side is exerted to the pin 2, the escaping-preventing ring 17 turns outward as shown FIG. 7, causing the guiding ramp surface corresponding surface 31 to contact with the ring guiding ramp surface 20. In this state, onto the escaping-preventing ring 17 a force $F_1$ is exerted, which is a compression force directed normal to the guiding ramp surface 20. The escape-preventing ring 17 having a rectangular cross section contacts with the ring guiding ramp surface 20 with a contacting area larger than the area which is obtainable by the escape-preventing ring having a circular cross section. Therefor, the compression force exerted onto the escape-preventing ring 17 having a rectangular cross section is rather small.

Figure 8:
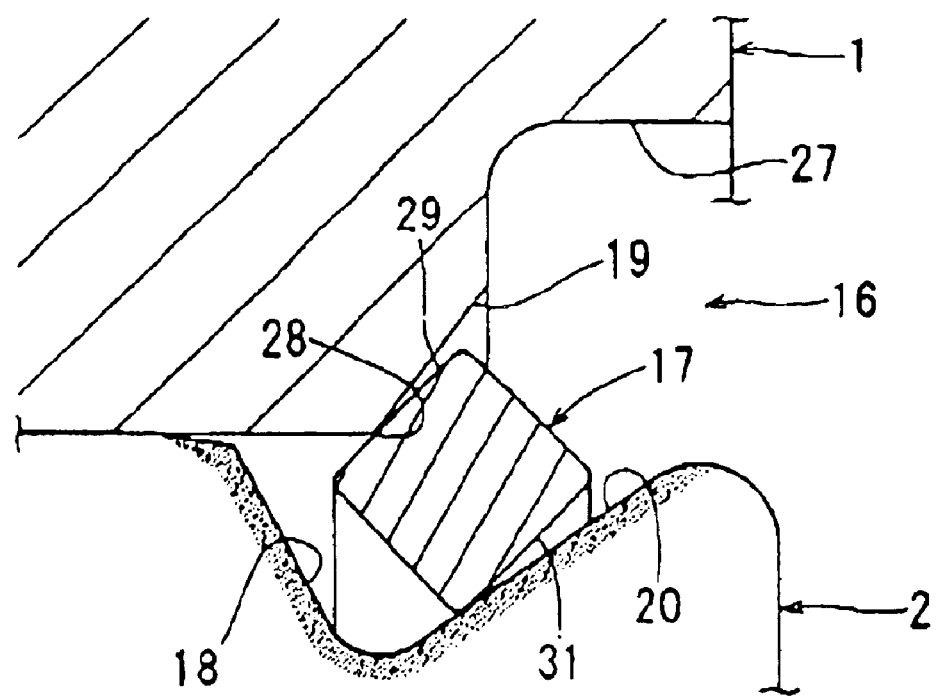
FIG. 8. is a cross sectional view showing function of the alternate fixing structure in the embodiment of FIG. 6.

In the embodiment shown in FIG. 8, the opening-periphery of the pin inserting bore 7 is formed with a tapered surface 19. In the embodiment shown in FIG. 9, the escape-preventing ring 17 is formed with a trapezoidal cross section. The escape-preventing ring 17 of FIG. 9 has the guiding ramp surface corresponding surface 31 and the inner diameter corresponding portion 29, wherein these surfaces 31 and 29 have diameters increasing outwardly, and have a distance between thereof increasing outwardly. The escape-preventing ring 17 of this embodiment has a cross section which contains two congruent triangles such that each the triangle has oblique sides of different length and, these triangles are abutted together. Thus, the escape-preventing ring 17 has a symmetrical portions, i.e., outward portion 33 and inward portion 34 arranged side by side in longitudinal direction, therefore, this escape-preventing ring 17 has no difference in shape between the front side and the rear side, allowing engaging operation of the ring 17 to be easy.

Figure 9:
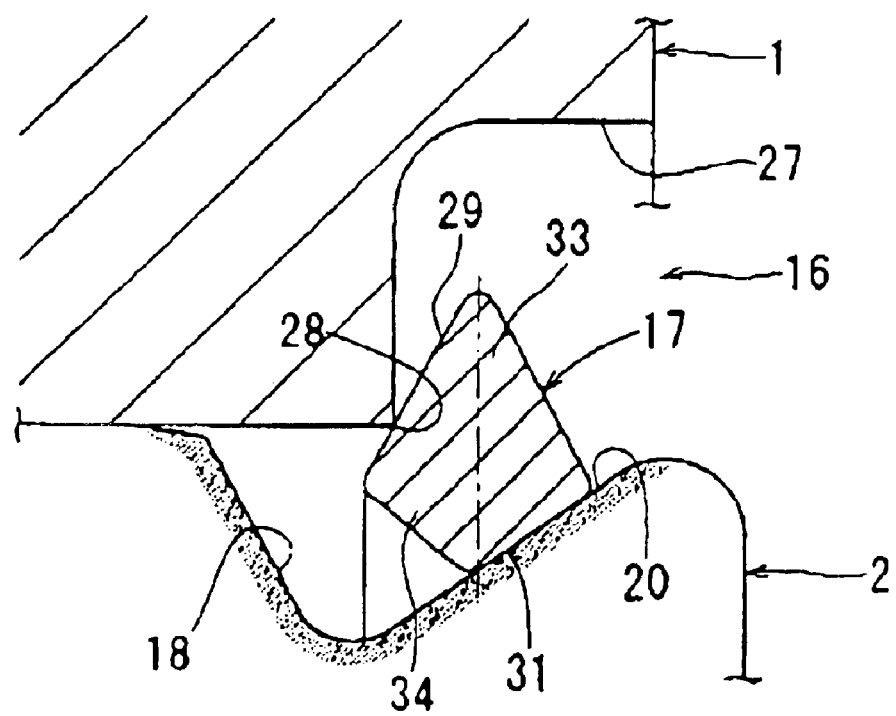
FIG. 9 is a cross sectional view showing function of the alternate fixing structure in the embodiment of FIG. 6.
Figure 10:
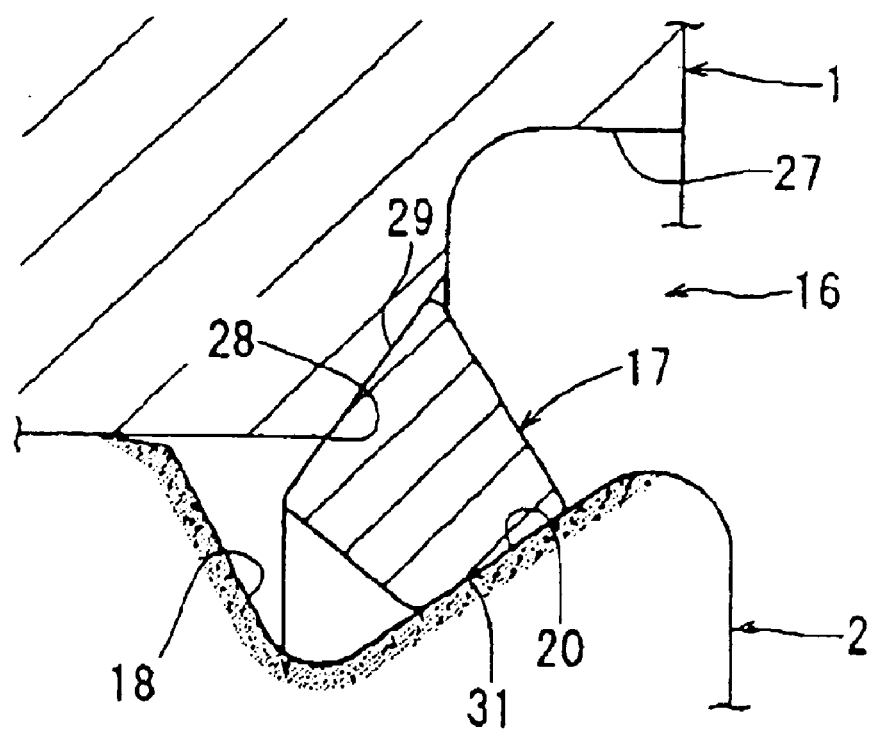
FIG. 10 is a cross sectional view showing function of the alternate fixing structure in the embodiment of FIG. 6.

In the embodiment shown in FIG. 10, the opening is formed with the tapered surface 19 in the same manner as the case of FIG. 8, and the escape-preventing ring 17 shown in FIG. 9 is used.

In the embodiment shown in FIGS. 8 through 10, wherein the escape-preventing ring 17 having not circular cross section is used, also used the pin 2 which is given hardness at the bottom surface of the concave groove 18 lower than hardness of the rink 1 engaging portion. Thus, brittle fracturing at the bottom portion of the concave groove 18 is effectively prevented. Moreover, the escape-preventing ring 17 having not circular cross section can provide a contact area between the escape-preventing ring 17 and the ring guiding surface (pressure bearing surface) 20, so that the contact area may be greater than that obtained by the escape-preventing ring 17 having circular cross section, accordingly, only with the elastic recoiling force of the escape-preventing ring 17, enough frictional force can be obtainable.

There have thus described certain preferred embodiments of a fixing structure for fixing pins with links in a caterpillar provided in accordance with the present invention, however the claims are not limited to the embodiments described herein. Therefore, it is expressly to be understood that modifications and variations made to the fixing structure of the present invention may be practiced while remaining within spirit and scope of the invention.

For example, decreasing hardness can perform by means without annealing, that is, without heat treating. For example, in the fixing structure illustrated by FIG. 4, on the taper surface 19, an annular surface is formed with radius generally similar to the radius of the outer surface of the escape-preventing ring 17 so that part of the outer surface of the escape-preventing ring 17 is engaged with the annular surface. Such structure allows the escape-preventing ring 17 to be fitted into the annular space 16. Link 1, pin 2, and the escape-preventing ring 17 can be made any material, not limited to carbon steel. In a word, materials which possess the following features are available. The materials should have optimum hardness for caterpillars used in vehicles. The hardness of the material can be adjustable so that the hardness of the bottom surface of the peripherally extending concave groove of the pin 2 is lower than the surface hardness at the portion with which link 1 is engaged. The cross section of the escape-preventing ring 17 can includes ellipse, triangle, polygon having corners more than five, semicircle, semi-ellipse, semi-polygon and the like.

What is claimed is:

1. A fixing structure for fixing a pin with a link in a caterpillar, the fixing structure comprising:
    a link;
    a pin inserted into a pin inserting bore provided on the link, the pin formed with a peripherally extending concave groove on an end portion of the pin, a peripheral rim of an opening of the pin inserting bore and the peripherally extending concave groove together forming an annular space;
    an escape-preventing ring for limiting relative motion of the pin toward an off-opening side being fitted in the annular space and contacting a surface of the groove, with a hardness of the pin at the contacted surface of the groove being lower than that of the pin at a portion with which the link is connected.

2. The fixing structure of claim 1 wherein the hardness of the contacted surface of the peripherally extending concave groove is lowered by an annealing process.

3. The fixing structure of claim 1 or 2, wherein the hardness of the contacted surface of the peripherally extending concave groove ranges from 30 to 45 as measured by a HRC scale and the hardness of the link engaging portion ranges from 50 to 65 as measured by a HRC scale.

4. A fixing structure for fixing a pin with a link in a caterpillar, comprising:
    a fixing structure comprising a link, a pin inserted into a pin inserting bore provided on the link;
    the pin formed with a peripherally extending concave groove on an end portion of the pin;
    a peripheral rim of an opening of the pin inserting bore and the peripherally extending concave groove together form an annular space;
    an escape-preventing ring for limiting relative motion of the pin toward an off-opening side is fitted, further a hardness of the pin at a bottom surface of the groove is lowered than that of the pin at a portion with which the link is connected;
    wherein the hardness of the bottom surface of the peripherally extending concave groove ranges from 30–45 as measured by a HRC scale.

5. A fixing structure for fixing a pin with a link in a caterpillars, comprising:
    a fixing structure comprising a link, a pin inserted into a pin inserting bore provided on the link;
    the pin formed with a peripherally extending concave groove on an end portion of the pin;
    a peripheral rim of an opening of the pin inserting bore and the peripherally extending concave groove together form an annular space;
    an escape-preventing ring for limiting relative motion of the pin toward an off-opening side is fitted, further a hardness of the pin at a bottom surface of the groove is lowered than that of the pin at a portion with which the link is connected;
    wherein the hardness of the link engaging portion ranges from 50 to 65 as measured by a HRC scale.

* * * * *